United States Patent
Messing et al.

(10) Patent No.: US 11,035,343 B2
(45) Date of Patent: Jun. 15, 2021

(54) WIND TURBINE AND METHOD FOR OPERATING A WIND TURBINE

(71) Applicant: Wobben Properties GmbH, Aurich (DE)

(72) Inventors: Ralf Messing, Aurich (DE); Wojciech Giengiel, Aurich (DE); Sven Seeberg, Westerholt (DE)

(73) Assignee: Wobben Properties GmbH, Aurich (DE)

( * ) Notice: Subject to any disclaimer, the term of this patent is extended or adjusted under 35 U.S.C. 154(b) by 98 days.

(21) Appl. No.: 16/461,305

(22) PCT Filed: Oct. 25, 2017

(86) PCT No.: PCT/EP2017/077271
§ 371 (c)(1),
(2) Date: May 15, 2019

(87) PCT Pub. No.: WO2018/091241
PCT Pub. Date: May 24, 2018

(65) Prior Publication Data
US 2020/0063713 A1    Feb. 27, 2020

(30) Foreign Application Priority Data
Nov. 16, 2016   (DE) .................... 10 2016 121 978.9

(51) Int. Cl.
*F03D 7/02*    (2006.01)
*F03D 9/25*    (2016.01)

(52) U.S. Cl.
CPC ........... *F03D 7/0296* (2013.01); *F03D 7/028* (2013.01); *F03D 7/0224* (2013.01); *F03D 9/25* (2016.05)

(58) Field of Classification Search
CPC ...... F03D 7/0224; F03D 7/028; F03D 7/0296; F03D 9/25; F05B 2260/96; F05B 2270/1033; F05B 2270/333
See application file for complete search history.

(56) References Cited

U.S. PATENT DOCUMENTS

| 4,700,081 A | 10/1987 | Kos et al. |
| 7,629,702 B2 | 12/2009 | Schubert |

(Continued)

FOREIGN PATENT DOCUMENTS

| CN | 101031720 A | 9/2007 |
| CN | 104662289 A | 5/2015 |

(Continued)

*Primary Examiner* — Ninh H. Nguyen
(74) *Attorney, Agent, or Firm* — Seed Intellectual Property Law Group LLP

(57) ABSTRACT

A wind power installation with a tower, an aerodynamic rotor, wherein the aerodynamic rotor can be operated with a variable rotor speed and has a number of rotor blades respectively with an adjustable rotor blade angle, a generator for generating an electrical output power, wherein for operating the wind power installation an operating characteristic, which indicates a relationship between the rotor speed and the output power, is specified and a controller, which sets the output power in a way corresponding to the operating characteristic in dependence on the rotor speed, is provided, wherein selectable as the operating characteristic is a reduced-tonality operating characteristic, which is designed such that an excitation of a system resonance of the wind power installation is reduced as compared with an optimum-power operating characteristic, without however excluding a speed that excites this system resonance.

19 Claims, 6 Drawing Sheets

(56) References Cited

U.S. PATENT DOCUMENTS

| | | | |
|---|---|---|---|
| 8,021,110 B2* | 9/2011 | Kerber | F03D 7/0296 416/1 |
| 8,487,464 B2 | 7/2013 | Skaare et al. | |
| 9,453,499 B2 | 9/2016 | Demtroder | |
| 9,518,561 B2 | 12/2016 | De Boer et al. | |
| 9,611,834 B2 | 4/2017 | Esbensen et al. | |
| 2008/0164091 A1 | 7/2008 | Kerber | |
| 2010/0133819 A1 | 6/2010 | Kinzie et al. | |
| 2012/0139244 A1 | 6/2012 | Bonnet | |
| 2013/0189105 A1* | 7/2013 | Bonnet | F03D 15/00 416/145 |
| 2013/0259684 A1* | 10/2013 | Hedeen | F16F 7/116 416/1 |
| 2017/0248127 A1* | 8/2017 | Drobietz | F03D 80/88 |

FOREIGN PATENT DOCUMENTS

| | | |
|---|---|---|
| EP | 1944667 A1 | 7/2008 |
| EP | 2581600 A2 | 4/2013 |
| JP | S62272899 A | 11/1987 |
| JP | S6339500 A | 2/1988 |
| JP | 2004293527 A | 10/2004 |
| JP | 2012514154 A | 6/2012 |
| RU | 2578251 C2 | 3/2016 |
| WO | 2012/139584 A1 | 10/2012 |
| WO | 2013/097863 A1 | 7/2013 |

\* cited by examiner

WIND TURBINE AND METHOD FOR OPERATING A WIND TURBINE

BACKGROUND

Technical Field

The present invention relates to a wind power installation. The present invention also relates to a method for parameterizing a wind power installation and the present invention relates to a method for operating a wind power installation.

Description of the Related Art

Wind power installations are known; they generate electrical power from wind, in particular in order to feed it into an electrical supply grid. Apart from the benefits of environmentally friendly power generation, the wind power installation can in some situations also be found to be disturbing. Particularly when wind power installations are operated in the vicinity of a populated area, operating noises of the wind power installation can be found to be disturbing.

Particularly noises of the wind on the rotor blades of the wind power installation may lead to a varyingly loud range of noises. In order to reduce such a range of noises and thereby make the wind power installation quieter, in some situations it may be proposed to reduce the rotational speed of the wind power installation.

However, there may also be other sources of sound. To be specific, sound may also be produced by vibrations in the towers or nacelles of wind power installations, in particular when resonances are excited. Such a sound, or a sound produced in such a way, may also be referred to as structure-borne sound. Increased sound power levels due to this structure-borne sound often occur in narrow frequency bands, are often of a low frequency and are perceived by the human ear as unpleasant. In frequency ranges, this noise emitted as structure-borne sound occurs as a peak in the respective frequency band.

Also such a structure-borne sound, in particular said peak in the frequency range, can be reduced during operation by cutting back the wind power installation. However, cutting back the operation of the wind power installation may also have the effect of reducing the overall range, and thereby allowing the peak of the structure-borne sound to become more dominant. This may even result in the effect that such structure-borne sound is perceived even more by the human ear, and is consequently found to be even more unpleasant.

Such structure-borne sound with a pronounced peak in the frequency range is also referred to as tonality.

Methods that exclude known resonances of installations during their operation are also known. Particularly provided for this purpose is a closed-loop speed control which excludes corresponding rotor speeds that excite system resonance, or passes through them as quickly as possible. One particular problem with such methods is that a decision has to be made as to whether the installation is to be operated at a lower or higher speed than the speed range to be excluded. If an otherwise desirable operating point lies in the range of the speed to be excluded, such a decision can become more difficult, and in the worst case may lead to continual changing between the next higher speed and the next lower speed.

The German Patent and Trademark Office has searched the following prior art in the priority application relating to the present application: US 2008/0164091 A1; US 2012/0139244 A1; WO 2012/139584 A1 and WO 2013/097863 A1.

BRIEF SUMMARY

A wind power installation according is proposed. The wind power installation has a tower, an aerodynamic rotor and a generator. The aerodynamic rotor, which has a number of rotor blades, although in principle one would be enough, can be operated with a variable rotor speed, and the rotor blades are adjustable in their rotor blade angle. The rotor blade angle is also referred to generally as the pitch angle and the adjusting of the rotor blade angle is also referred to generally as pitching.

An operating characteristic, which indicates a relationship between the rotor speed and the output power, is specified for operating the wind power installation. Particularly, the wind power installation is operated in dependence on such an operating characteristic in such a way that, when a rotor speed is established, a corresponding output power is set according to the operating characteristic. Provided for this is a controller, which sets the output power in dependence on the rotor speed in a way corresponding to the operating characteristic. Therefore provided as the operating characteristic is a reduced-tonality operating characteristic, which is selectable. It is correspondingly selected whenever the tonality is to be reduced or restricted.

This reduced-tonality operating characteristic is designed such that excitation of a system resonance of the wind power installation is reduced in comparison with an operating characteristic for optimum power. However, the reduced-tonality operating characteristic is in this case formed such that it does not exclude a speed exciting this system resonance. Particularly, this reduced-tonality operating characteristic is a continuous characteristic.

It is consequently proposed to select a different, but not abrupt operating characteristic for reducing or restricting the tonality.

It is preferably proposed that the operating characteristic is selectable from the reduced-tonality operating characteristic, the optimum-power operating characteristic and a reduced-sound operating characteristic. The optimum-power operating characteristic is in this case the operating characteristic which is designed such that taking power from the wind is maximized. This optimum-power operating characteristic may be selected particularly whenever a sound reduction is not in principle necessary, or in the given situation no disturbing sound is to be expected. That may for example also depend on the wind direction, if for example it is the case that the wind only carries sound from the wind power installation into an unpopulated area.

The reduced-sound operating characteristic is designed such that sound emissions of the wind power installation are generally reduced as compared with the optimum-power operating characteristic. Particularly, here a sound power range of the sound emissions is reduced. By contrast, with the reduced-tonality operating characteristic, the tonality is specifically reduced. This may also mean that the overall noise range is not reduced, or only slightly as compared with the optimum-power operating characteristic.

This selection between the operating characteristics mentioned consequently allows the wind power installation to be easily set to the respective conditions or requirements, while continuous operation or continuous operational control is ensured.

According to one configuration, it is proposed that the reduced-tonality operating characteristic has lower values of the output power in a resonance speed range than the optimum-power operating characteristic in the same resonance speed range, the reduced-tonality operating characteristic also being steady in the resonance speed range. The resonance speed range is consequently a range in which the rotor speed that excites the system resonance of the wind power installation lies. Here, the reduced-tonality operating characteristic has an at least somewhat flatter shape than the optimum-power operating characteristic.

Both operating characteristics indicate the output power in dependence on the rotor speed, although an equivalent rotational speed could also be used, and the reduced-tonality operating characteristic is correspondingly lowered here. At least, a value of the output power at the resonance speed of the reduced-tonality operating characteristic is less than in the case of the optimum-power operating characteristic. In this case, however, the reduced-tonality operating characteristic is also steady in the resonance speed range. Therefore, it is not the case here that a solitary value of the output power but the overall range is lower, but this means that at least one value of the reduced-tonality operating characteristic is also lower than the power-optimized operating characteristic. It is also possible in this way to take the tonality specifically into consideration, in that in the speed range concerned the power is specifically reduced. Consequently, forces acting at this speed are also reduced overall, and correspondingly excitation of the system resonance is also reduced.

The wind power installation may in principle also have a number of system resonances, but it is assumed here that one system resonance is dominant and that the proposed measure has the effect that this system resonance is excited less. Nevertheless, the wind power installation can in this case be operated with a steady operating characteristic.

Preferably, even in the resonance speed range, the reduced-tonality operating characteristic is continuously differentiable and strictly monotonously rising. The operating characteristic is therefore steady even on the basis of a derivative, that is to say a derivative of the output power with respect to the rotor speed. Furthermore, it is strictly monotonously rising; therefore, the output power increases with the increase in rotor speed, without there being any region that is descending or stays the same. As a result, the operating characteristic can also be easily used for controlling the wind power installation for reduced-tonality operation. It is particularly avoided that regions of the operating characteristic that are horizontal or even descending again cause the occurrence of indeterminate and/or unstable ranges for closed-loop control to be implemented.

According to a further embodiment, it is proposed that the reduced-tonality operating characteristic can be divided into a first, second and third rotor speed range. In this case, the first rotor speed range begins at a starting speed, which denotes a rotor speed with which the wind power installation is started. The second rotor speed range has higher rotational speeds than the first rotor speed range, and consequently follows on from the first rotor speed range. The third rotor speed range has still higher rotational speeds than the second rotor speed range and extends up to a rated speed. In this case, the second rotor speed range comprises the resonance rotor speed. The three rotor speed ranges, and consequently also the resonance speed, consequently lie in partial-load operation or a partial-load range. This partial-load operation consequently extends from the beginning of the first rotor speed range to the end of the third rotor speed range. The second rotor speed range is consequently a mid-range in this partial-load operation and the resonance speed is in this mid-range. The resonance speed or the resonance speed range is consequently the rotational speed or the range at which or in which the system resonance is excited.

In addition, according to one embodiment it is proposed that in the second rotor speed range the output power of the reduced-tonality operating characteristic is lower than the output power of the optimum-power operating characteristic. It is also proposed that the second rotor speed range in particular comprises the resonance speed range, or corresponds to it.

According to a preferred embodiment, the wind power installation is characterized in that it is provided with a pitch control, which sets the rotor blade angle in dependence on the generated output power in partial-load operation in a way corresponding to a pitch characteristic. Furthermore, the pitch characteristic is selectable from a number of pitch characteristics in dependence on the selected operating characteristic. It is particularly proposed that a dedicated pitch characteristic is provided for each operating characteristic.

It has been realized here that a variable pitch angle is advisable even in partial-load operation. Consequently, in partial-load operation a predetermined constant optimum angle, that is to say fixed partial-load angle, is not used, but instead it is set in a way corresponding to the respective conditions.

It has also been realized that, depending on the chosen operating characteristic, that is to say in particular whether a reduced-tonality, reduced-sound or optimum-power operating characteristic is formed, a corresponding pitch characteristic is selected. The respective pitch characteristic is in this case preferably made to match the respective operating characteristic. This allows the operation of the wind power installation also to be adapted aerodynamically to the respective operating characteristic, and consequently to the respective operating situation.

It has been realized that, by changing the speed-dependent output power, as a result different rotor speeds and consequently tip speed ratios in comparison for example with an optimum-power operating characteristic may occur, even in the same wind conditions. Such changes, particularly of the tip speed ratio, are taken into consideration by the adapted pitch characteristic.

According to one embodiment, it is proposed that the pitch characteristic can be divided into a first, second and third output power range. The first output power range in this case begins at a starting power, which corresponds to an output power with which the wind power installation is started. The second output power range follows on and correspondingly has higher output powers than the first output power range. The third output power range has a higher output power than the second output power range and extends up to a maximum output power of partial-load operation or up to a rated power of the generator.

The wind power installation is consequently preferably also divided into three output power ranges in its operating behavior in partial-load operation. Also in this way, specific operation that takes various situations into consideration is possible even in partial-load operation. It has also been realized for this that the use of a single constant rotor blade angle in partial-load operation can be improved, at least for implementing the reduction of tonality.

In this respect, it is also proposed according to the one embodiment that, when selecting the reduced-tonality operating characteristic, an adapted pitch characteristic, which may also be referred to as a reduced-tonality pitch characteristic, is specified. Such an adapted pitch characteristic preferably has a greater rotor blade angle in the first output power range than an optimum-power pitch characteristic in the same output power range. In this case, an optimum-power pitch characteristic is such a characteristic that is proposed for use in connection with an optimum-power operating characteristic.

It is consequently proposed that the pitch characteristic can be adapted in dependence on the selected operating characteristic. Therefore, an adapted pitch characteristic is proposed for this. Preferably, a controller of the wind power installation already contains one or more corresponding pitch characteristics and these can then be selected according to the chosen operating characteristic.

Also or alternatively, the adapted pitch characteristic, that is to say the reduced-tonality pitch characteristic, has a greater rotor blade angle in the second output power range than an optimum-power pitch characteristic in the same output power range.

The adapted pitch characteristic is in this case greater in the second output power range, that is to say has a greater rotor blade angle, than an optimum-power pitch characteristic in the same output power range. Also or alternatively, the adapted pitch characteristic may have a smaller rotor blade angle in the second output power range as compared with the first output power range. The blade angle is accordingly greater in comparison with the optimum-power pitch characteristic and also or alternatively smaller in comparison with the first output power range.

Preferably, the second output power range corresponds to the second rotor speed range. This means particularly that, whenever it is operated in the second output power range, the wind power installation is also operated in the second rotor speed range. In graphic terms, these two ranges cover the same wind speed range, without however expressly including the wind speed for the classification. Preferably, the first, second and third output power range respectively corresponds to the first, second and third rotor speed range. Explanations given above in relation to the individual ranges can consequently be respectively applied equally to the pitch characteristics and operating characteristics. In particular, a change between the respective first, second and third range can equally be performed both in the case of the pitch characteristic and in the case of the operating characteristic.

According to an alternative, the pitch angle is likewise set in dependence on the rotor speed, and correspondingly pitch characteristics are respectively specified in dependence on the rotor speed. Here it is particularly preferably proposed that the same rotor speed ranges are taken as a basis for the pitch characteristic as for the operating characteristic.

According to one configuration, it is proposed that the second output power range corresponds to a wind speed range of approximately 4 to 10 meters per second. The second output power range consequently concerns a great mid range of partial-load operation. The advantageous changing of the characteristics can be particularly applied here, applying it well after the start-up wind speed and, in the upward direction, likewise well before a transition to full-load operation.

Also or alternatively, it is proposed that the second rotor speed range lies in a range of approximately 20% to 80% of the rated speed of the rotor. Also in this way, a great mid range of partial-load operation is provided for this second rotor speed range to obtain the advantages described. There is no need here for upper and lower limit ranges.

Preferably, the wind power installation is characterized in that, at least in the second rotor speed range, the reduced-tonality operating characteristic has reduced values of the output power as compared with the optimum-power operating characteristic and that the adapted pitch characteristic has in the same range changed rotor blade angles as compared with an optimum-power pitch characteristic. As a result, a worsening of a power coefficient that occurs due to changing the tip speed ratio is at least partially counteracted. The adapted pitch characteristic consequently takes this changing of the tip speed ratio into consideration.

In addition, the adapted pitch characteristic may also be changed as compared with the optimum-power pitch characteristic in the first output power range, in that the pitch characteristic has greater rotor blade angles there than the optimum-power pitch characteristic.

By increasing the blade angles, an improvement of the aerodynamics can particularly also be achieved.

According to one embodiment, it is proposed that, when using the reduced-tonality operating characteristic in the range of wind speeds from a starting wind speed at least up to half the rated wind speed, the tip speed ratio is strictly monotonously descending with increasing wind speed. In particular, a slope of less than −2 is proposed. Therefore, for example, a value of −3 and −4 are also conceivable. According to one embodiment, values of −10 are proposed. This relates to a wind speed normalized to the rated speed.

Preferably, the ratio of a tip speed ratio when using the reduced-tonality operating characteristic to a tip speed ratio when using an optimum-power operating characteristic is greater than 1. The tip speed ratio when using the reduced-tonality operating characteristic is consequently greater in each case than the corresponding tip speed ratio when using the optimum-power operating characteristic.

A method for parameterizing a wind power installation is also proposed. Here, too, a wind power installation with a tower and an aerodynamic rotor is taken as a basis. The aerodynamic rotor can be operated with a variable rotor speed and has a number of rotor blades respectively with an adjustable rotor blade angle. Also provided is a generator for generating an electrical output power.

For parameterizing, first an optimum-power operating characteristic, which indicates a relationship between the rotor speed and the output power, is determined. In this case, the optimum-power operating characteristic is chosen such that the wind power installation delivers maximum output power as long as it is operated in a way corresponding to this operating characteristic.

Also, a resonance speed is recorded, describing a rotor speed that excites a system resonance of the wind power installation. Here, too, such a system resonance may be a resonance of the tower, the nacelle or other elements of the wind power installation. Also conceivable is a resonance for the wind power installation as a whole, in the case of which a number of elements together determine the system resonance, such as for example the tower and the nacelle together.

Also determined is a reduced-tonality operating characteristic, which has lower values of the output power in the resonance speed range as compared with the optimum-power operating characteristic. The reduced-tonality operating characteristic is in this case determined such that it is also steady in the resonance speed range. Therefore, in fact a reduced-tonality operating characteristic is determined, not just solitary speed-power values that are specifically to be aimed for or specifically to be avoided.

The result of this proposed parameterization is particularly the determination of the reduced-tonality operating characteristic. Altogether, however, at least two operating characteristics are parameterized, to be specific the optimum-power characteristic and the reduced-speed characteristic. The wind power installation can then be operated at least with one of these two operating characteristics, according to choice. If no requirements for reducing tonality have been specified, because for example an excitation of such tonality is not to be expected in any case, or because nobody in the vicinity of the wind power installation feels disturbed by such tonality, the wind power installation may be operated with the optimum-power operating characteristic. Here, an operating characteristic that is known in principle may also be used as the optimum-power operating characteristic. This reduced-tonality operating characteristic may only be used when the need for reducing the tonality exists. Preferably, however, the wind power installation is then permanently operated with the reduced-tonality operating characteristic. It is really not intended to switch continually back-and-forth between an optimum-power operating characteristic and a reduced-tonality operating characteristic.

Preferably, a wind power installation according to at least one of the embodiments described above is parameterized. In this case, at least one element of the following list is parameterized:
  the optimum-power pitch characteristic;
  the adapted pitch characteristic;
  the first rotor speed range;
  the second rotor speed range;
  the third rotor speed range;
  the first output power range;
  the second output power range;
  the third output power range; and
  the reduced-sound operating characteristic.

All of these elements have already been described above in connection with embodiments of the wind power installation, and it is proposed to perform the parameterization precisely in such a way as to result in what has been described above in connection with at least one embodiment of the wind power installation.

According to one embodiment, it is proposed that the recording of the resonance speed takes place by varying the rotor speed and recording a related tonality in the vicinity of the wind power installation. Then the rotor speed at which the tonality has a maximum is used as the resonance speed. This preferably takes place in a predetermined test frequency range, which lies in a range between 10 Hz and 100 Hz.

The tonality is a dominant noise, particularly of one frequency. Consequently, it is not the case that the sound power of an entire sound power range is recorded, but that specifically the component of such a noise of one frequency is observed. Such a noise of one frequency then increases particularly greatly when the rotor speed has a value at which the wind power installation is excited to produce this noise. In particular, this is a structure-borne sound that is emitted by a wind power installation due to a corresponding motion of this wind power installation.

On the basis of a resonance speed thus recorded, the reduced-tonality operating characteristic can also be determined. On the basis of that, an adapted pitch characteristic can then be determined. Such an adapted pitch characteristic may also be referred to as a reduced-tonality pitch characteristic, because it can be assigned to at least one reduced-tonality operating characteristic.

Preferably, the reduced-tonality operating characteristic is determined such that the output power in the resonance speed range, in particular at the resonance speed, is reduced as compared with the optimum-power operating characteristic to the extent that the tonality recorded in the vicinity of the wind power installation goes below a predetermined limit value. Preferably, the process of reducing the output power and recording the tonality is repeated, or performed continuously, until the tonality goes below the predetermined limit value.

Here, too, consequently a specific noise of one frequency is investigated, to be specific particularly the noise that occurs at the resonance speed, particularly when the resonance speed has been recorded as described above. Consequently, the installation is preferably operated at the resonance speed and the power is reduced until this noise at the one frequency goes below the predetermined limit value. The reduced-tonality operating characteristic can then be designed such that at this resonance speed it has the low generator speed value thus found. In this case, the operating characteristic is however specified such that it is steady, in particular continuously differentiable and strictly monotonously rising. The result is then an operating characteristic that has a low power value at the resonance speed. This does not mean, however, that as a result much less power is generated overall in comparison with the power of the optimum-power operating characteristic at the same speed. Rather, a different operating point is established. A strictly monotonously rising operating characteristic produces an operating point of a higher speed. It should also be noted that operation according to a reduced-tonality operating characteristic, that is to say reducing the tonality at all, may also mean a sound power range that is increased, or at least not reduced. Operation in which the sound power level is reduced may mean an increase in the tonality, or at least no reduction. For the tonality, or the perception of a noise of an isolated frequency, the ratio of such a dominant noise of a frequency in comparison with the remaining sound power range is of significance in particular.

A method for operating a wind power installation is also proposed. Here, too, the wind power installation has a tower, an aerodynamic rotor and a generator for generating electrical power, as already described above in connection with a wind power installation.

An operating characteristic, which indicates a relationship between the rotor speed and the output power, is specified for operating the wind power installation, and the output power is set in dependence on the rotor speed in a way corresponding to the operating characteristic. In this case, a reduced-tonality operating characteristic can be selected as the operating characteristic. This is designed such that excitation of a system resonance of the wind power installation is reduced as compared with an optimum-power operating characteristic, without however excluding a speed that excites this system resonance. In particular, it is proposed that the wind power installation is operated in such a way that is also provided by the explanations of the embodiments described above of wind power installations. Preferably, it is also proposed that a wind power installation according to an embodiment described above is used.

According to a preferred embodiment, it is proposed that, in dependence on an external specification or a time of day, switching takes place between operation of the wind power installation with the reduced-tonality operating characteristic, operation of the wind power installation with the optimum-power operating characteristic, which is designed such that taking power from the wind is maximized, and operation of the wind power installation with a reduced-sound operating characteristic, which is designed such that sound emissions of the wind power installation, particularly a sound power range of the sound emissions, is/are reduced as compared with the optimum-power operating characteristic. It is consequently possible to choose between optimum-power operation, reduced-tonality operation and reduced-sound operation. The choice is made by selecting a corresponding operating characteristic. Here, too, it must be emphasized once again that reduced-tonality operation, and consequently a reduced-tonality operating characteristic, differs fundamentally from reduced-sound operation or a reduced-sound operating characteristic.

Also proposed most fundamentally is a wind power installation that conforms to at least one embodiment described above of a wind power installation and has been parameterized according to an embodiment describing a parameterization, and also or alternatively is operated by a method according to a described embodiment.

BRIEF DESCRIPTION OF THE SEVERAL VIEWS OF THE DRAWINGS

The invention is now described in more detail below by way of example on the basis of embodiments with reference to the accompanying figures.

DETAILED DESCRIPTION

Figure 1:
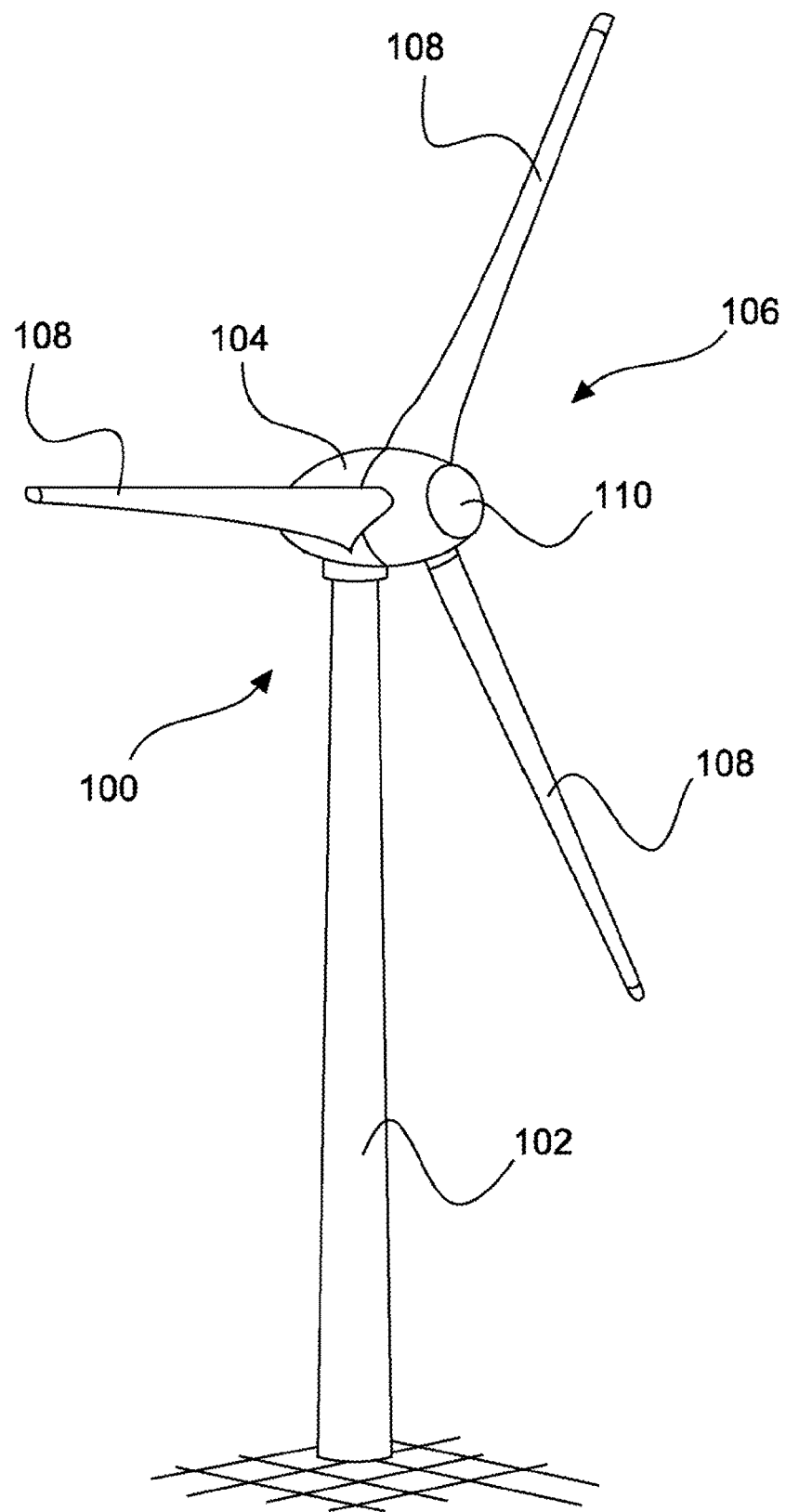
FIG. 1 shows a wind power installation in a perspective representation.

FIG. 1 shows a wind power installation 100 with a tower 102 and a nacelle 104. Arranged on the nacelle 104 is a rotor 106 with three rotor blades 108 and a spinner 110. During operation, the rotor 106 is set in a rotary motion by the wind, and thereby drives a generator in the nacelle 104.

It has been realized that, during the operation of wind power installations, not only sound that is caused by the flow around the rotor blades is produced, but also possibly sound due to vibrations in the towers or nacelles or other elements, in particular in cases of resonance. Increased sound power levels due to this structure-borne sound often occur in narrow frequency bands, are often of a low frequency and are perceived by the human ear as unpleasant. In frequency ranges, this noise excited by structure-borne sound occurs as a peak in the respective frequency band and is taken into consideration in the sound emission assessment of the wind power installation as a tonality allowance.

Figure 9:
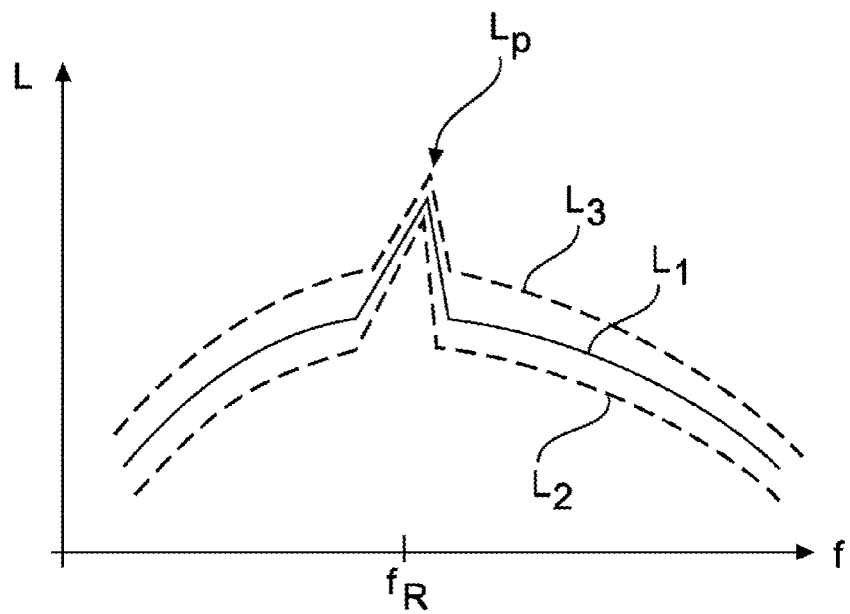
FIG. 9 schematically shows a diagram of the sound power level.

FIG. 9 illustrates such a frequency range. There, the sound power level L in dependence on the frequency f is plotted schematically as a diagram. A sound power level is schematically represented by a solid line as the sound power level $L_1$. Likewise schematically depicted for purposes of explanation are a comparatively substantially reduced sound power level $L_2$ and an altogether increased sound power level $L_3$.

At the resonance frequency $f_R$, there is a peak $L_P$, which shows a tonality. It should be realized that this peak $L_P$ appears even more clearly if the overall sound power level is reduced, as is the case with the reduced sound power level, $L_2$. Conversely, the dominance of the peak may diminish with the increased sound power level $L_3$.

It has thus been realized that the occurrence of resonances and the resultant tonality can be minimized by skillful selection of the operating characteristic, that is to say specifying the electrical output power in dependence on the generator speed. In the case where the resonance and the associated tonality are caused by the generator, the tonality can be minimized particularly effectively by adaptation of the operating characteristic.

Figure 2:
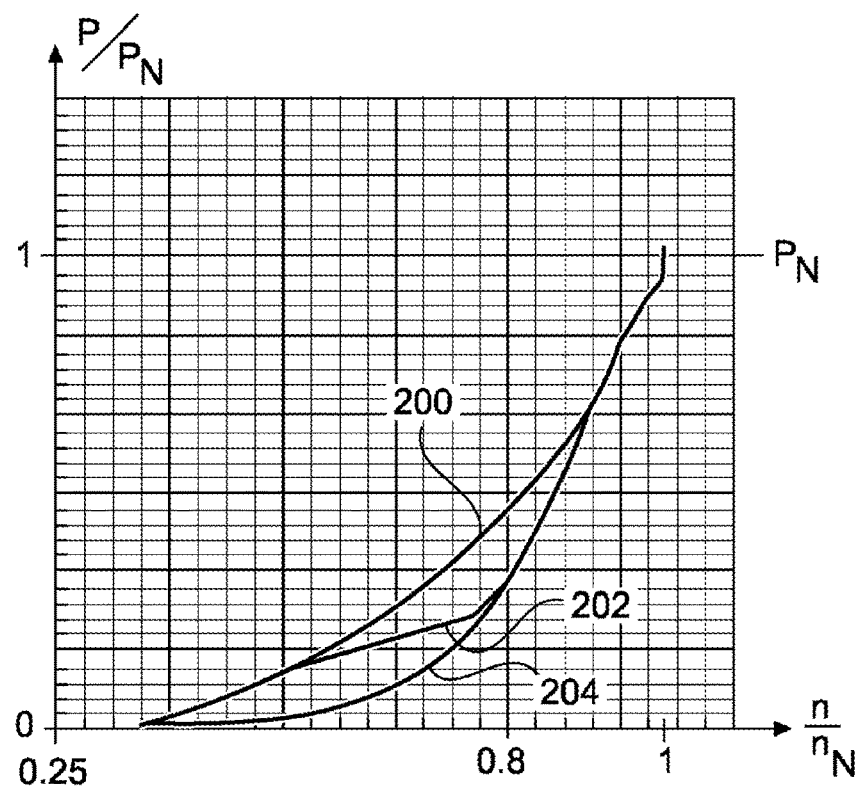
FIGS. 2 and 3 respectively show a diagram with different operating characteristics.

FIG. 2 shows for this by way of example a change of operating characteristics. FIG. 2 shows here three different operating characteristics, that is to say the functional relationship between the electrical output power P of the wind power installation and the rotor speed n. Apart from an optimum-power operating characteristic 200, two reduced-tonality characteristics 202 and 204 are also shown. This optimum-power characteristic consequently describes how the installation is operated in the optimum-power operating mode, when no tonality of the installation occurs or no tonality has to be reduced, and consequently corresponds to a characteristic of the prior art.

In the event that tonality occurs at the installation and has to be reduced, the two reduced-tonality operating characteristics 202 and 204 are proposed. In the case of the wind power installation taken as a basis, there was an increased sound power level in the form of a peak in a frequency range that was excited particularly at a normalized rotational speed in the range of 0.8. Consequently, here this normalized rotational speed of 0.8 is a or the resonance speed.

To avoid this tonality, it is consequently proposed to reduce the power take-up of the generator in this speed range. The two reduced-tonality operating characteristics 202 and 204 can be used for this. Both reduced-tonality operating characteristics 202 and 204 achieve the effect that, at the normalized resonance speed of 0.8, the power has been reduced by over 40 percent in comparison with the optimum-power operating characteristic. In this case, the two reduced-tonality operating characteristics 202 and 204 are structurally different. The reduced-tonality operating characteristic 204 already provides lower powers at the beginning than in the case of the optimum-power characteristic, while the other reduced-tonality characteristic 202 at low rotational speeds initially coincides with the optimum-power characteristic 200. In any event, however, both reduced-tonality operating characteristics 202 and 204 are operating characteristics with a continuous progression, which even in the range of the resonance speed are steady, continuously differentiable and otherwise also strictly monotonously rising. In fundamental terms, the reduced-tonality characteristics 202 and 204 can therefore be taken as a basis for operational control or installation control in very much a similar way to the operating characteristic 200.

Figure 3:
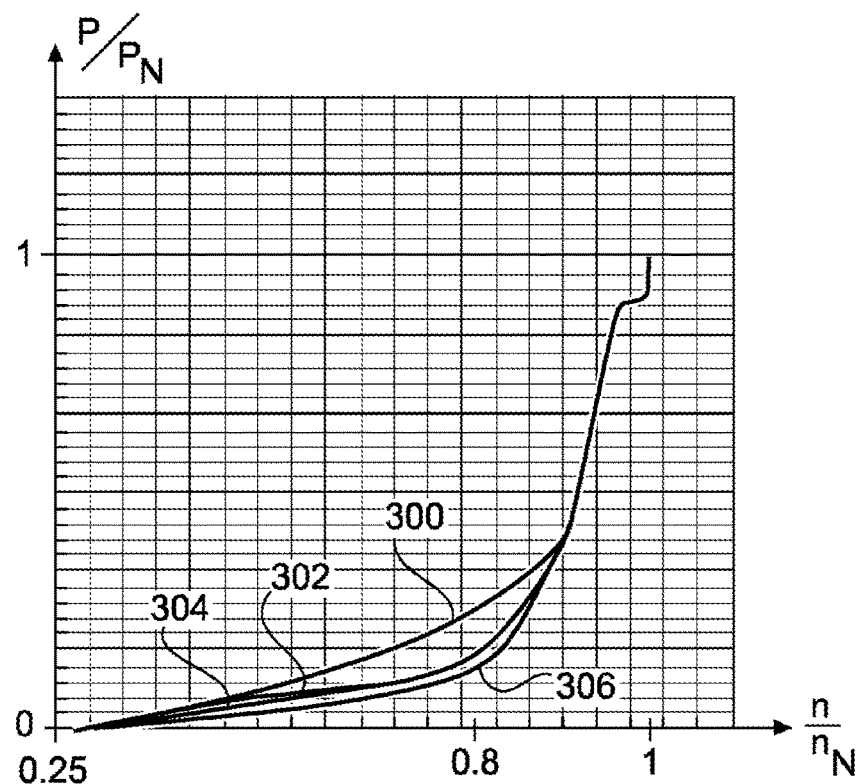

FIG. 3 just shows one further example as compared with FIG. 2. In the case of the diagram of FIG. 3, the critical normalized speed range is also at approximately 0.8. Here, too, an optimum power operating characteristic 300 is depicted and also three reduced-tonality operating characteristics 302, 304 and 306. All of the reduced-tonality operating characteristics 302, 304 and 306 and moreover also those of FIG. 2 are examples of reduced-tonality operating characteristics.

The three reduced-tonality operating characteristics 302, 304 and 306 also have the effect that the normalized resonance speed, which here is 0.8, lead to a reduction in the power to approximately half in comparison with the optimum-power operating characteristic. However, it has also been realized that, although the occurrence of a tonality can be avoided, or can be reduced, by the procedure described here, particularly in relation to FIGS. 2 and 3, the adaptation of the operating characteristic means that the optimum tip speed ratio range of the rotor blade is abandoned, to be specific in favor of higher tip speed ratios. This is explained by two examples in FIGS. 4 and 5.

Specifically, in the case of the proposed reduced-tonality operating characteristics the rotor blades rotate faster than before at the same wind speed, that is to say faster than when using the respectively shown optimum-power operating characteristic. In this respect, it has been realized that the axial induction in the rotor blade plane increases, which typically leads to reduced power coefficients. It has consequently been realized that at first, without further solution proposals, the avoidance or reduction of the tonality explained in FIGS. 2 and 3 may consequently lead to a loss of yield of the wind power installation.

Figure 4:
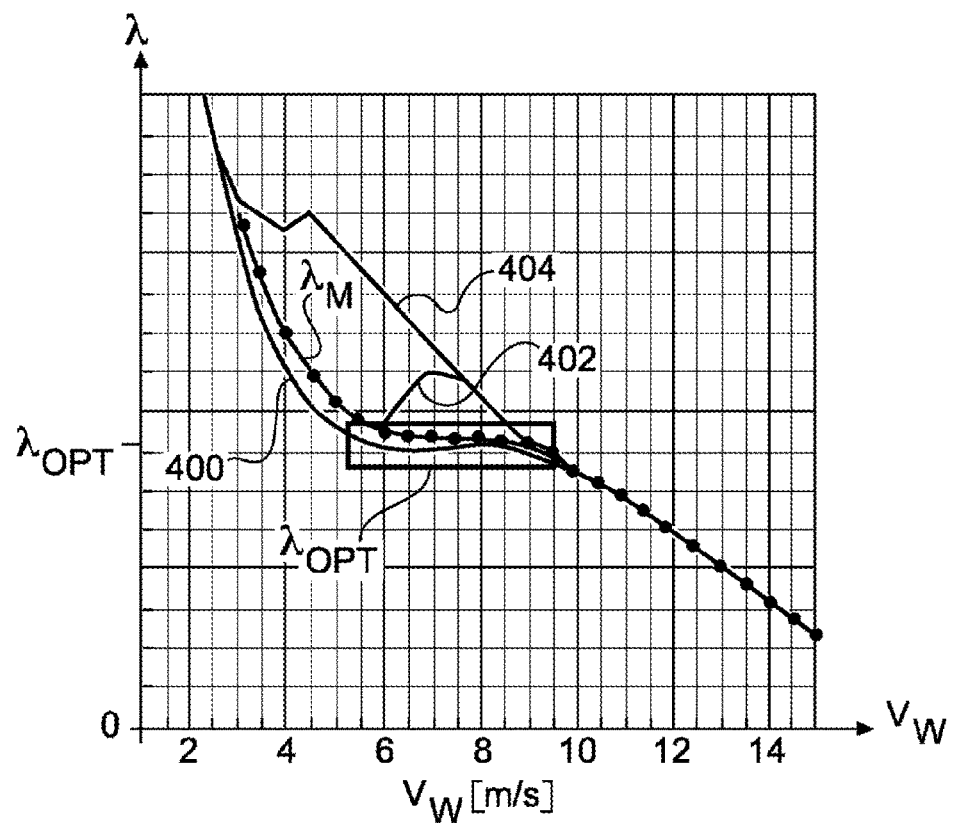
FIGS. 4 and 5 respectively show a diagram with different progressions of tip speed ratios.
Figure 5:
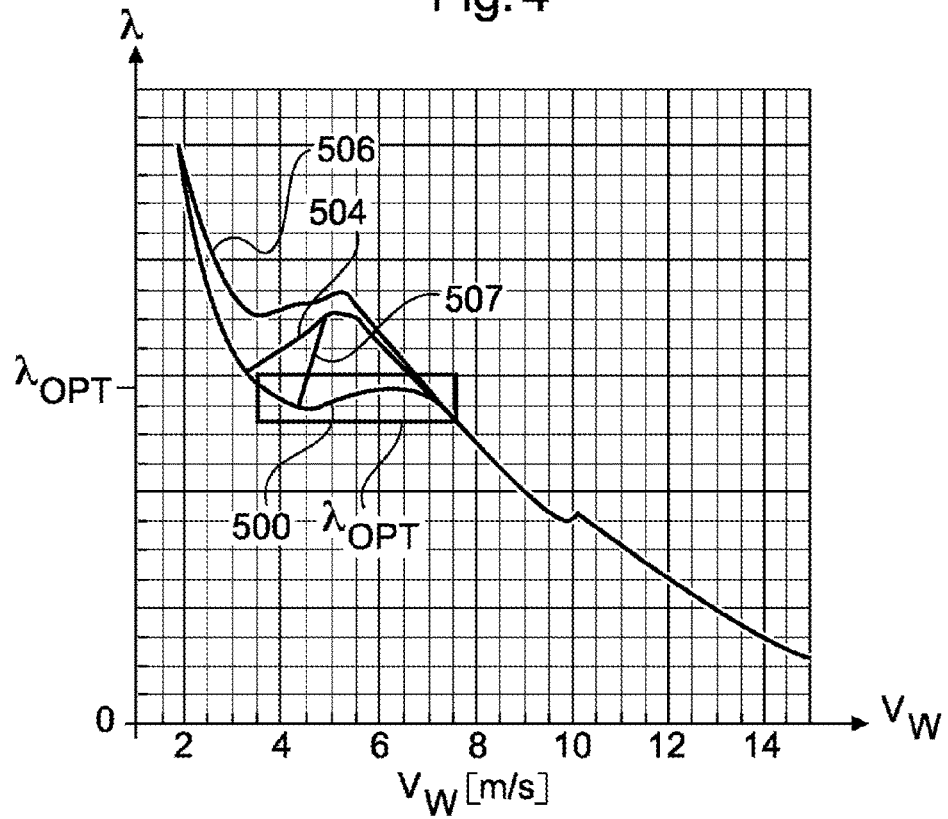

FIG. 4 and FIG. 5 show in principle the progressions of the tip speed ratios in relation to the corresponding operating characteristics of FIGS. 2 and 3, respectively, when no adaptation of the pitch characteristics is performed. In this case, the progressions 400, 402 and 404 correspond to the tip speed ratio λ, with the operating characteristics 200, 202 and 204 of FIG. 2. In FIG. 4, a characteristic with several measuring points is also depicted and this characteristic indicates measurements, and consequently confirms the other progressions, which are calculated or simulated. In FIG. 5, the tip speed ratio progressions 500, 502, 504 and 506 correspond to the operating characteristics 300, 302, 304 and 306, respectively, of FIG. 3. In both FIGS. 4 and 5, an optimum tip speed ratio range $\lambda_{OPT}$ is also depicted. It is evident that the progressions of the tip speed ratios that do not belong to the optimum-power operating characteristic are mostly not within the optimum tip speed ratio range. It has consequently been realized that to this extent the wind power installations do not run optimally, and remedial action in this respect is proposed.

Figure 6:
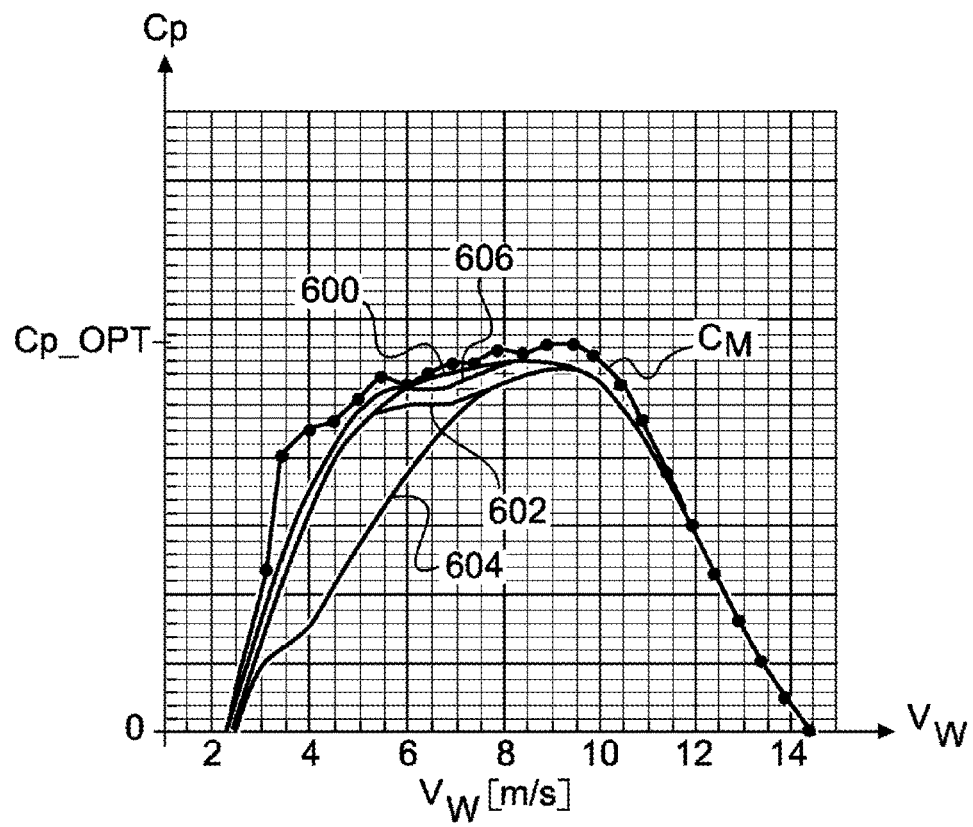
FIG. 6 shows a diagram with progressions of different power coefficients.

For the case of FIG. 2, such a loss of the power coefficient $c_p$ is represented in FIG. 6. The progressions of the $c_p$ values 600, 602 and 604 correspond to the operating characteristics 200, 202 and 204, respectively, of FIG. 2. The optimum $C_P$ value $C_{P\_OPT}$ is depicted and it is evident that, for the reduced-tonality operating characteristic 604, a significantly reduced $c_p$ value is established, at least for lower wind speeds V. The reduced-tonality operating characteristic 202 also leads to a worse progression 602 for the $c_p$ value. Otherwise, the measured value $c_M$ for the $c_p$ value is also depicted in FIG. 6.

Consequently, to some extent significant drop in the power coefficient to the wind speed of approximately 10 meters per second can be found in each case. In order to compensate partially or even completely for this loss of yield, it is therefore also proposed to modify in addition to the operating characteristic also the pitch characteristic. It has consequently also been realized that, with the changing of the operating characteristic, an important aspect is that a changing of the pitch characteristic is also performed. The pitch characteristic is the term used to refer to the relationship between the electrical output power $P_{e1}$ and the pitch angle of the rotor blades that is stored in the installation controller. Regarded as the electrical output power is the power that the installation actually delivers and can feed into an electrical supply grid. There are various conceivable possibilities for recording this output power, such as for example determining it from the DC link if a full converter concept with a DC link is used. However, a current-voltage measurement at the output terminals of the wind power installation is also conceivable. The output power can then also be referred to synonymously as the installation power.

It is therefore now proposed to adapt the pitch characteristic in order to avoid likely losses of yield of the wind power installation with the present raising of the tip speed ratios during operation with the characteristics. It is consequently important, at least for one embodiment, to propose a new operating characteristic and a new pitch characteristic, to be specific in particular a reduced-tonality operating characteristic and a pitch characteristic adapted thereto, which can also be referred to as a reduced-tonality pitch characteristic.

Figure 7:
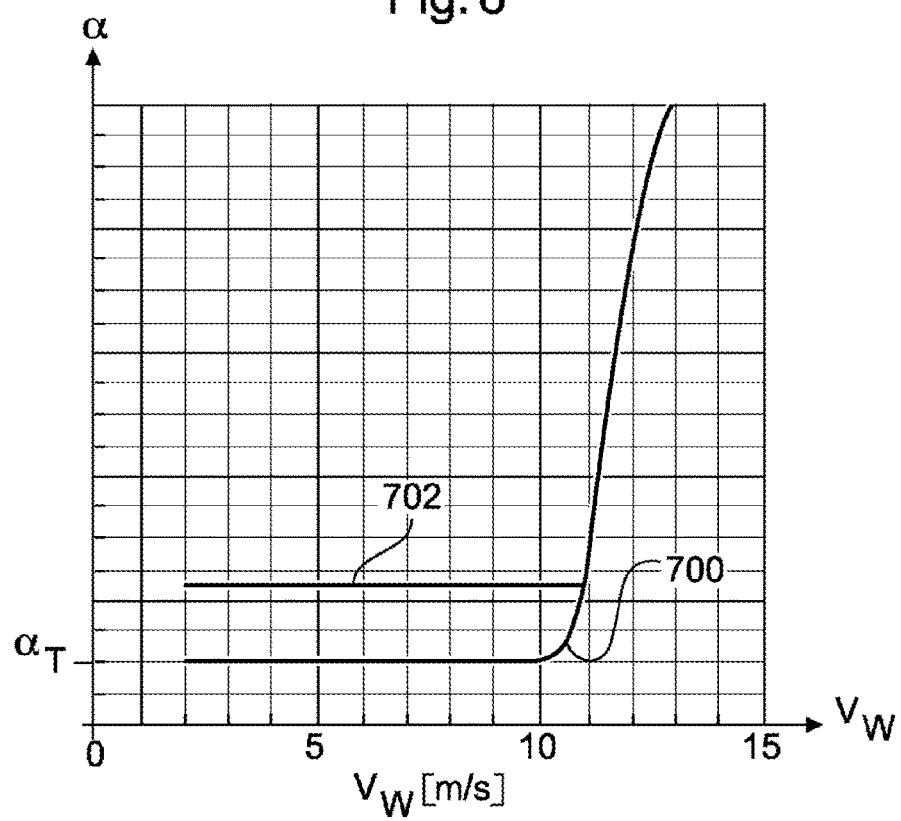
FIGS. 7 and 8 respectively show a diagram with different pitch characteristics.
Figure 8:
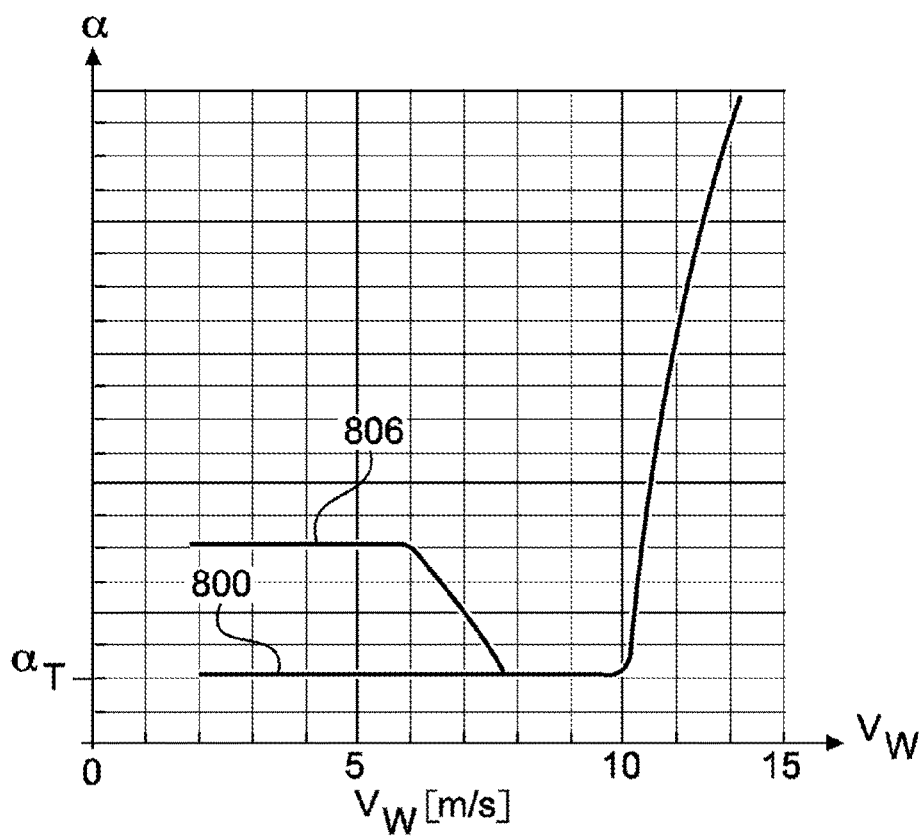

FIGS. 7 and 8 show in each case a pitch characteristic 700 and 800, respectively, for an optimum-power operating characteristic 200 and 300 according to FIG. 2 and FIG. 3, respectively, and an adapted pitch characteristic 702 and 806, respectively, which is assigned to the respective reduced-tonality operating characteristic 202 or 306. Depicted in each case is a partial-load angle $\alpha_T$, which denotes the blade angle that is used in normal optimum-power operation as the blade angle during partial-load operation.

In FIG. 7 it is evident in this case that the minimum pitch angle has been raised as compared with the partial-load angle $\alpha_T$. This has made it possible to compensate for losses of yield due to the proposed reduced-tonality operating characteristic. In this respect, it is evident in FIG. 6 with the progression of the power coefficient 606 that it has been possible by this measure to improve the power coefficient, that is to say by changing the blade angle 702. This changed progression 606 of the power coefficient thus differs only little from the progression 600 of the power coefficient for the optimum-power operating characteristic.

FIG. 8 shows in this case a progression 806 of the blade angle and a pitch characteristic with which the progression of the pitch angle of the optimum-power operating characteristic has been modified in a somewhat more complex form in order to avoid losses of yield. Up to approximately 6 m/s, the minimum pitch angle is raised, to then reduce it again to the partial-load angle $\alpha_T$ by approximately 8 m/s.

FIGS. 7 and 8 show the progressions of the blade angles in dependence on the wind speed $V_W$. For a practical implementation, however, it is proposed to store pitch characteristics. Here, the blade angle may depend particularly on a rotor speed, and be set dependent on that. The rotor speed is a good basis for instance for recording the respective operating point of the wind power installation, and correspondingly a blade angle can be selected. As a result, a blade angle will be set in dependence on the wind speed, to be specific as represented in FIG. 7 or 8. However, the wind speed is not taken as a basis for this, at least not exclusively.

Figure 10:
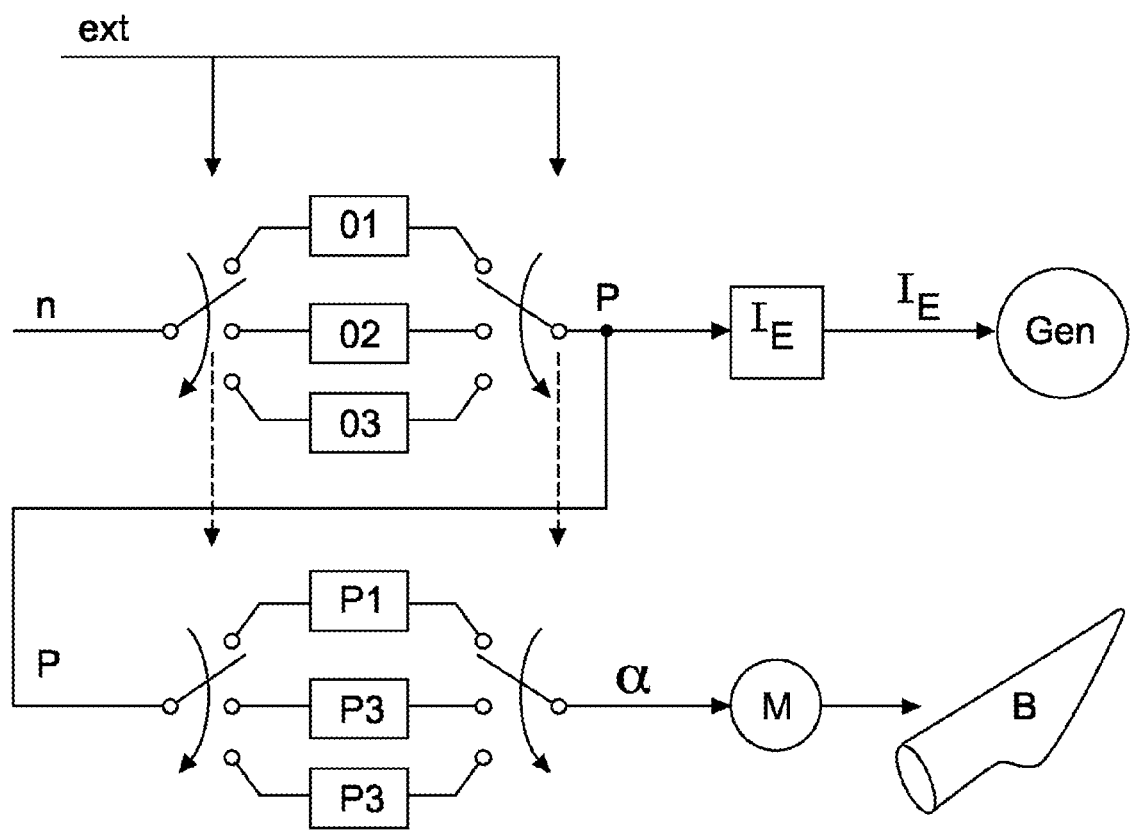
FIG. 10 schematically shows a control structure for implementing a closed-loop control according to an embodiment of the invention.

FIG. 10 illustrates a possible implementation. Operating characteristics O1, O2 and O3 are stored there, and an external signal ext can be used for switching between them. The input variable of these operating characteristics O1, O2 and O3 is formed by the rotational speed n, and a power P is obtained as output values. This power P is then to be set for the generator. One possibility is to carry this out at least partially by changing excitation current, which is indicated by the block $I_E$. The result is then an excitation current $I_E$, which can be passed directly to the rotor of the generator Gen, at least whenever the generator is a separately excited synchronous machine. However, there are also other conceivable possibilities, such as for example influencing a stator current of the generator.

Also stored are three pitch characteristics P1, P2 and P3, between which a selection can likewise be made. The representation of FIG. 10 is intended to indicate that the same external signal ext is also used for a corresponding selection between the pitch characteristics. In this case, the selection is to be performed such that a pitch characteristic P1, P2 and P3 is respectively assigned to the operating characteristic O1, O2 or O3, and consequently therefore the operating characteristic O1 is operated or used together with the pitch characteristic P1, the operating characteristic O2 is operated or used with the pitch characteristic P2 and the operating characteristic O3 is operated or used with the pitch characteristic P3. The operating characteristic O1 may stand here for an optimum-power operating characteristic and the operating characteristic O2 may stand for a reduced-tonality operating characteristic. The operating characteristic O3 may for example stand for a reduced-sound operating characteristic, or else for an alternative, that is to say further, reduced-tonality operating characteristic.

The structure of FIG. 10 shows that the operating characteristics O1, O2 and O3 receive as an input variable the power P. The power P, which forms the output respectively of one of the three pitch characteristics P1, P2 and P3, is used here for the sake of simplicity. That is intended here to be illustrative of the use of the output power of the wind power installation. With a correspondingly adapted pitch characteristic, the rotor speed or an equivalent rotational speed may be used instead of the power P, particularly when using a gear mechanism, which however is usually better to avoid if in the end it makes a difference whether the rotor speed of the aerodynamic rotor or a generator speed is used, to give just one example. In any event, the output value of the pitch characteristics P1, P2 and P3 is the blade angle α. This can in each case be passed to an adjusting motor, which is indicated here as motor M, which in turn sets the respective blade angle of the rotor blade B.

It may possibly be advantageous to set a different dynamic between the power setting of the generator by the respective operating characteristic on the one hand and the adjustment of the blade angle by the corresponding pitch characteristic on the other hand, in order to ensure stable behavior. In the case of the structure illustrated in FIG. 10, particularly the use of the actuating element $I_E$ for adjusting the excitation current should have the effect however that the adjustment of the power of the generator is already much quicker than the blade adjustment, so that as a result there are already different dynamics, and consequently there is already a stability of the control.

The invention claimed is:

1. A wind power installation, comprising:
   a tower;
   an aerodynamic rotor, wherein the aerodynamic rotor is configured to be operated with a variable rotor speed and has a plurality of rotor blades, each of the plurality of rotor blades having an adjustable rotor blade angle;
   a generator configured to generate an electrical output power, wherein when operating the wind power installation, an operating characteristic, which indicates a relationship between the rotor speed and the output power, is selected;
   a controller configured to set the output power in a way corresponding to the selected operating characteristic in dependence on the rotor speed, wherein a reduced-tonality operating characteristic is selectable as the operating characteristic, wherein the reduced-tonality operating characteristic is configured such that an excitation of a system resonance of the wind power installation is reduced as compared with an optimum-power operating characteristic, without excluding a rotor speed that excites the system resonance; and
   a pitch controller configured to set the rotor blade angle in dependence on the generated output power in partial-load operation in a way corresponding to a pitch characteristic, wherein the pitch characteristic can be adapted in dependence on the selected operating characteristic.

2. The wind power installation as claimed in claim 1, wherein the operating characteristic is at least selectable from:
   the reduced-tonality operating characteristic;
   the optimum-power characteristic, which is designed such that taking power from wind is maximized; and
   a reduced-sound operating characteristic, which is designed such that sound emissions of the wind power installation are reduced as compared with the optimum-power operating characteristic.

3. The wind power installation as claimed in claim 1, wherein:
   the reduced-tonality operating characteristic has lower values of the output power in a resonance speed range of a rotor speed exciting a system resonance of the wind power installation than the optimum-power operating characteristic in a same resonance speed range, and
   the reduced-tonality operating characteristic is steady in the resonance speed range.

4. The wind power installation as claimed in claim 1, wherein even in the resonance speed range, the reduced-tonality operating characteristic is continuously differentiable and strictly monotonously rising.

5. The wind power installation as claimed in claim 1, wherein:
   the reduced-tonality operating characteristic is configured to be divided into first, second, and third rotor speed ranges,
   the first rotor speed range begins at a starting speed, which denotes a rotor speed with which the wind power installation is started,
   the second rotor speed range has higher rotational speeds than the first rotor speed range, and
   the third rotor speed range has higher rotational speeds than the second rotor speed range and extends up to a rated speed, and wherein the second rotor speed range comprises the resonance rotor speed, and in the second rotor speed range the output power of the reduced-tonality operating characteristic is lower than the output power of the optimum-power operating characteristic, wherein the second rotor speed range comprises the resonance speed range.

6. The wind power installation as claimed in claim 5, wherein at least one of:
   the pitch characteristic is configured to be divided into first, second, and third output power ranges,
   the first output power range begins at a generator power corresponding to an output power with which the wind power installation is started,
   the second output power range has higher output powers than the first output power range, the third output power range has higher output powers than the second output power range and extends up to a maximum output power of partial-load operation or up to a rated power of the generator, wherein when selecting the reduced-tonality operating characteristic, an adapted pitch characteristic is selected, the adapted pitch characteristic has a greater rotor blade angle in the first output power range than an optimum-power pitch characteristic in the same output power range, the adapted pitch characteristic has a greater rotor blade angle in the second output power range than an optimum-power pitch characteristic in a same output power range, and the adapted pitch characteristic has a smaller rotor blade angle in the second output power range than in the first output power range.

7. The wind power installation as claimed in claim 6, wherein at least the second output power range corresponds to the second rotor speed range.

8. The wind power installation as claimed in claim 6, wherein at least one of:
the second output power range corresponds to a wind speed range of approximately 4 to 10 m/s; and
the second rotor speed range lies in a range of approximately 20% to 80% of the rated speed of the rotor.

9. The wind power installation as claimed in claim 6, wherein at least in the second rotor speed range, the reduced-tonality operating characteristic has reduced values of the output power as compared with the optimum-power operating characteristic and the adapted pitch characteristic has in the same range changed rotor blade angles as compared with an optimum-power pitch characteristic, in order to at least partially counteract a worsening of a power coefficient that occurs due to changing a tip speed ratio.

10. The wind power installation as claimed in claim 9, wherein the adapted pitch characteristic is changed as compared with the optimum-power pitch characteristic in the first output power range in that the adapted pitch characteristic in the first output power range has greater rotor blade angles than the optimum-power pitch characteristic.

11. The wind power installation as claimed in claim 5, wherein when using the reduced-tonality operating characteristic in a range of wind speeds from a starting wind speed at least up to half a rated wind speed, a tip speed ratio is strictly monotonously descending with increasing wind speed.

12. The wind power installation as claimed in claim 1, wherein ratio of a tip speed ratio when using the reduced-tonality operating characteristic to a tip speed ratio when using an optimum-power operating characteristic is greater than 1.

13. A method comprising:
parameterizing a wind power installation with a tower and an aerodynamic rotor, wherein the aerodynamic rotor is configured to be operated with a variable rotor speed and has a plurality of rotor blades, each with an adjustable rotor blade angle, the wind power installation including a generator configured to generate an electrical output power, wherein parameterizing comprises:
determining an optimum-power operating characteristic indicative of a relationship between the rotor speed and the output power, wherein the optimum-power operating characteristic is chosen such that the wind power installation delivers maximum output power when operated using the optimum-power operating characteristic;
recording a resonance speed, wherein the resonance speed describes a rotor speed that excites a system resonance of the wind power installation;
establishing a resonance speed range around the resonance speed; and
determining a reduced-tonality operating characteristic that has lower values of the output power in the resonance speed range in comparison to the optimum-power operating characteristic, wherein the reduced-tonality operating characteristic reduces resonance of the wind power installation in the resonance speed range.

14. The method as claimed in claim 13, further comprising determining at least one of:
an optimum-power pitch characteristic,
an adapted pitch characteristic,
a first rotor speed range,
a second rotor speed range,
a third rotor speed range,
a first output power range,
a second output power range,
a third output power range, and
a reduced-sound operating characteristic.

15. The method as claimed in claim 13, wherein the recording of the resonance speed includes:
varying the rotor speed, and
recording a related tonality in a vicinity of the wind power installation and the rotor speed at which the tonality has a maximum is used as the resonance speed.

16. The method as claimed in claim 13, wherein determining the reduced-tonality operating characteristic such that the output power in the resonance speed range is reduced in comparison with the optimum-power operating characteristic to the extent that a tonality recorded in a vicinity of the wind power installation goes below a predetermined limit value.

17. The method as claimed in claim 16, wherein in dependence on an external specification or a time of day, switching takes place between,
operation of the wind power installation with the reduced-tonality operating characteristic,
operation of the wind power installation with the optimum-power operating characteristic, which is designed such that taking power from the wind is maximized, and
operation of the wind power installation with a reduced-sound operating characteristic, which is designed such that sound emissions of the wind power installation are reduced when compared with sound emissions of the optimum-power operating characteristic.

18. A method comprising:
operating a wind power installation having a tower and an aerodynamic rotor, wherein the aerodynamic rotor is configured to be operated with a variable rotor speed and has a plurality of rotor blades, each of the plurality of rotor blades having an adjustable rotor blade angle, the wind power installation including a generator configured to generate an electrical output power, wherein operating includes:
selecting an operating characteristic for operating the wind power installation, the operating characteristic being indicative of a relationship between the rotor speed and the output power;

setting the output power in dependence on a rotor speed in a way corresponding to the operating characteristic, wherein a reduced-tonality operating characteristic is selectable as the operating characteristic, wherein the reduced-tonality operating characteristic is configured such that an excitation of a system resonance of the wind power installation is reduced as compared with an optimum-power operating characteristic, without excluding a rotor speed that excites the system resonance; and adapting a pitch characteristic in dependence on the selected operating characteristic and providing a pitch controller configured to set the rotor blade angle in dependence on the generated output power in partial-load operation in a way corresponding to the pitch characteristic.

19. A wind power installation configured to perform the method as claimed in claim 18.

\* \* \* \* \*